United States Patent
McGee et al.

(10) Patent No.: US 6,572,965 B1
(45) Date of Patent: Jun. 3, 2003

(54) MULTILAYER ADHESIVE BARRIER FILMS FOR WATER RESISTANT CARPET PAD APPLICATIONS

(75) Inventors: Robert L. McGee, Midland, MI (US); Mary Anne Wright, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/568,836

(22) Filed: May 11, 2000

Related U.S. Application Data

(60) Provisional application No. 60/200,811, filed on Apr. 28, 2000.

(51) Int. Cl.[7] .................. B32B 15/04; B32B 7/12; B32B 27/08; C09J 7/02
(52) U.S. Cl. .................. 428/343; 428/483; 428/354; 428/476.1; 428/476.9; 428/516; 428/515; 428/523
(58) Field of Search .................. 428/343, 354, 428/516, 483, 515, 476.1, 476.9, 523

(56) References Cited

U.S. PATENT DOCUMENTS

| | | | | |
|---|---|---|---|---|
| 3,940,525 A | * | 2/1976 | Ballard | 428/96 |
| 4,684,573 A | * | 8/1987 | Mueller et al. | 428/349 |
| 5,114,795 A | * | 5/1992 | Percec et al. | 428/516 |
| 5,272,236 A | | 12/1993 | Lai et al. | 526/348.5 |
| 5,612,113 A | * | 3/1997 | Irwin, Sr. | 488/97 |
| 5,837,358 A | * | 11/1998 | Bauer et al. | 428/213 |
| 5,843,581 A | * | 12/1998 | Paleari et al. | 428/518 |

FOREIGN PATENT DOCUMENTS

| | | | |
|---|---|---|---|
| DE | 4208991 | 9/1993 | B32B/7/10 |
| EP | 424761 | 7/1994 | B32B/27/32 |
| JP | 60-149453 | 8/1985 | B29C/65/40 |
| JP | 62-073942 | 4/1987 | B23B/27/32 |

* cited by examiner

Primary Examiner—Daniel Zirker
Assistant Examiner—Victor Chang

(57) ABSTRACT

A multiple layer adhesive and barrier film that combines good adhesion to substrates such as a foam material with a barrier to liquid permeation provides the substrate with a liquid barrier and adequate wear characteristics, particularly when the substrate is a foam material used as a carpet pad.

9 Claims, No Drawings

MULTILAYER ADHESIVE BARRIER FILMS FOR WATER RESISTANT CARPET PAD APPLICATIONS

This application claims the benefit of Provisional Application No. 60/200,811, filed Apr. 28, 2000.

FIELD OF THE INVENTION

This invention relates generally to adhesive films, more particularly to multilayer adhesive films that contain at least one barrier layer and still more particularly to the use of such multilayer films to impart water resistance to a foam carpet pad.

BACKGROUND OF THE INVENTION

U.S. Pat. No. (USP) 5,612,113 discloses a carpet that has a primary backing layer from which yarn strands extend, a secondary backing layer bonded to the primary backing layer and a thin, liquid impervious layer bonded to the secondary backing layer by way of a non-aqueous thermoplastic adhesive. The adhesive may be, for example, a hot melt adhesive.

DE 4208991 discloses a plastic edge band for edging wooden furniture. The band, cut from a strip or continuous sheet, consists of at least two layers of plastic, 400–4000 micrometers ($\mu$m) thick and 12–200 millimeters (mm) wide. Band preparation employs coextrusion, multiple extrusion or lamination. At least one layer must contain polypropylene homopolymer (PP), propylene copolymer, high density polyethylene (HDPE) or a mixture thereof. The layer must also contain a non-self adhesive, solvent-free, adhesive film. The adhesive film contains a polymer with acid, ester or other polar group functionality. One such polymer is an ethylene/methyl acrylate/maleic anhydride terpolymer.

JP 62-073.942 discloses a film prepared by laminating a biaxially stretched PP film and a resin layer formed from a mixture of an ethylene/propylene (EP) block copolymer resin, a petroleum resin or a terpene resin, and an ethylene/acrylic acid (EAA) copolymer resin.

J60-149,453 discloses a composite film comprising a laminated biaxially stretched PP film and a heat-sensitive adhesive resin film. The adhesive resin film is preferably an ethylene/alpha-olefin (EAO) copolymer that may be modified or graft polymerized with maleic anhydride (MAH).

EP 424,761 discloses a multilayer film that has at least mono-axial orientation. The film includes a PP core layer that is substantially free of an antiblock agent such as silica ($SiO_2$), at least one PP outer layer and an antiblock agent and at least one heat-laminated layer. The latter layer comprises an ethylene/vinyl acetate (EVA) copolymer, an ethylene acrylate copolymer, an EAA polymer or mixtures of the above.

SUMMARY OF THE INVENTION

The present invention is a multiple layer adhesive and barrier film that comprises at least three layers, the layers being a) a core layer having a first side and an opposing second side, b) an adhesive layer bonded to the first side of the core layer, and c) a barrier layer bonded to the second side of the core layer, the barrier layer comprising a polymer blend including a propylene copolymer and an acid anhydride grafted propylene copolymer, the core layer comprising an ethylene/alpha-olefin copolymer, and the adhesive layer comprising an ethylene copolymer that contains polar moieties and an anti-block compound.

DESCRIPTION OF THE PREFERRED EMBODIMENTS

The expression "ethylene homopolymer" encompasses homopolymers consisting essentially of ethylene monomer units as well as ethylene polymers containing minor amounts of monomer units other than ethylene provided that such polymers have the characteristics substantially similar to an ethylene homopolymer consisting essentially of ethylene monomer units. Suitable ethylene homopolymers include linear low density polyethylene (LLDPE) and low density polyethylene (LDPE). Preferred LDPE polymers are prepared using a constrained geometry metallocene catalyst (CGC), such as those disclosed in U.S. Pat. No. 5,272,236. A commercially available and suitable LLDPE for use in the polymer blend is DOWLEX* 2247A, which is available from The Dow Chemical Company.

* means Trademark of The Dow Chemical Company.

The multiple layer adhesive and barrier film (MLABF) of the present invention comprises at least three layers. The layers include a core layer with a first side and an opposing second side; an adhesive layer bonded to the first side of the core layer and a barrier layer bonded to the second side of the core layer. The use of first and second to designate sides of the core layer simply provides a basis to show that the adhesive layer bonds to one side of the core and the barrier layer bonds to the other side of the core.

The core layer comprises an EAO copolymer. The EAO copolymer has polymerized therein ethylene and at least one copolymerizable alpha-olefin ($\alpha$-olefin) monomer that contains from 3 to 20 carbon atoms ($C_{3-20}$), preferably from 3 to 8 carbon atoms ($C_{3-8}$). Illustrative $\alpha$-olefins include propylene, butene-1, pentene-1, hexene-1, heptene-1 and octene-1. The EAO copolymer is preferably linear low density polyethylene (LLDPE). A preferred LLDPE is an ethylene/octene-1 copolymer commercially available from The Dow Chemical Company under the Trademark DOWLEX.

The core layer may further comprise a color concentrate. The color concentrate comprises an amount of pigment dispersed in a copolymer carrier. The amount of pigment desirably ranges from 50 to 70 percent by weight (wt %), based on color concentrate weight. The amount preferably ranges from 55 to 68 wt %. The color concentrate is desirably present in an amount within a range of from 10 to 20 percent by weight, based on core layer weight. The copolymer carrier must simply be compatible with the EAO copolymer of the core layer and aid in dispersing the pigment throughout the core layer. "Compatible", as used herein, means that a blend of the copolymer carrier and the EAO copolymer visually appears to contain a single phase rather than either co-continuous phases or a continuous phase and a discrete phase. Preferred carrier polymers include low density polyethylene (LDPE) and linear low density polyethylene (LLDPE).

The adhesive layer comprises an ethylene copolymer that contains polar moieties. The polar moieties of the ethylene copolymer provide a polar functionality that improves adhesion with other materials. Such ethylene copolymers include ethylene/acrylic acid (EAA) copolymer resins and graft-modified ethylene polymers, such as maleic anhydride-modified (MAH-modified) ethylene polymers, especially MAH-modified LLDPE. An EAA copolymer suitable for use in the polymer blend is PRIMACOR* 1430 (commercially available from The Dow Chemical Company). An anhydride-modified LLDPE that is suitable for use in the polymer blend is BYNEL® 4104 (commercially available from E. I. du Pont de Nemours and Company). The polar moiety-containing ethylene copolymer can be used in nearly any amount. However, the amount is preferably from 35% to about 100% by weight (wt %), based on adhesive layer weight. Amounts below 30 wt % have a diminished ability to enhance adhesion. * means Trademark of The Dow Chemical Company.

The adhesive layer preferably further comprises an anti-block concentrate. The concentrate is preferably present in an amount within a range of from 1 to 10 percent by weight, based on adhesive layer weight. Satisfactory results follow with an anti-block concentrate that comprises silicon dioxide ($SiO_2$) in a LDPE carrier resin. An $SiO_2$ content of from 15 to 20 percent by weight, based on concentrate weight, provides preferred results. A commercially available material meeting these criteria has a 15 wt % SiO2 content and an 85 wt % polyethylene content (CN-734 available from Southwest Plastics), the amounts totaling 100 wt %.

If the adhesive layer includes LLDPE, the adhesive layer also preferably comprises a minor amount of a processing aid, such as AMPACET™ 10562, which is 3 wt % VITON® A (a fluoroelastomer available from DuPont Dow Elastomers, L. L. C.) in 97 wt % polyethylene, the percentages being based on processing aid weight and totaling 100%.

If desired, either or both of the adhesive layer and the core layer may contain one or more additives such as colorants, UV stabilizers, antioxidants and flame retardants.

The barrier layer comprises a polymer blend that comprises a propylene copolymer and an acid anhydride grafted propylene copolymer. The acid anhydride grafted propylene copolymer is preferably a maleic anhydride grafted propylene copolymer. A suitable commercially available anhydride-modified polypropylene is BYNEL® 50E571 (E. I. du Pont de Nemours and Company). The grafted copolymer is preferably present in an amount within a range of from 20 to 40 percent by weight, based on polymer blend weight. The amount is preferably about 30 weight percent. If the amount declines below 20 wt %, especially significantly below 20 wt % (as in 10 wt %), the barrier layer has a level of functionality below that needed to provide desirable results. As the amount exceeds 40 wt %, especially with amounts in excess of 50 wt %, costs increase to a point that it overwhelms desirable performance attributes of the copolymer.

The multi-layer adhesive film may serve a variety of useful purposes. One such purpose is as a barrier layer of a foam/film laminate used as a carpet pad. The carpet pad suitably comprises a cushioning foam layer that has at least two spaced-apart and generally parallel major planar surfaces. At least one of the surfaces has a multi-layer adhesive film adhered thereto in order to reduce, preferably eliminate, liquid absorption by the carpet pad.

The multiple layer adhesive films have a thickness that typically ranges from 1 mil (25 micrometers ($\mu$m)) to 4 mils (100 $\mu$m), and are more typically about 2 mils (50 $\mu$m). While any of a number of film preparation techniques may be used to make the multiple layer adhesive films of the present invention, either a blown film extrusion process or a cast film process, yields very satisfactory results. Co-extrusion provides even more preferred results as it appears to provide better interlayer contact and bonding than alternate techniques such as casting each layer separately and then forming a multiple layer film. The films preferably have a 2% secant modulus, as determined by ASTM D882, of at least 25,000 pounds per square inch (psi) (172.4 megapascals (MPa)) at 230° C. Although the films preferably have a modulus in the machine direction (MD) equal to that of the transverse direction (TD), skilled artisans understand that conventional film forming processes yield films with an MD modulus that exceeds the TD modulus. The 2% secant modulus is preferably at least 25,000 psi (172.4 MPa) at 23° in any direction, whether MD or TD.

The following examples illustrate, but do not limit, the invention. Unless otherwise stated, all parts and percentages are by weight and all temperatures are expressed as degrees centigrade (° C).

Example (Ex) 1

Use cast film extrusion to prepare a MLABF. The MLABF contains three layers, an adhesive layer and two barrier layers. The two barrier layers have the same composition. The MLABF has an overall thickness average of 2.3 mils (58 micrometers ($\mu$m)). The adhesive layer constitutes 75% by volume (vol %), based on total film volume, and contains 54 wt % LLDPE (DOWLEX* 2247A, The Dow Chemical Company), 40 wt % EAA copolymer (PRIMACOR* 1430, The Dow Chemical Company), 5 wt % antiblock concentrate (CN-744, Southwest Plastics (20 wt % $SiO_2$ and 80 wt % LDPE )) and 1 wt % process aid (AMPACET™ 10562 (3 wt % VITON® A (a fluoroelastomer available from DuPont Dow Elastomers, L. L. C.) in 97 wt % polyethylene)). The barrier layers constitute 25 vol % and contain 70 wt % propylene copolymer (Inspire* C 103–04, The Dow Chemical Company) and 30 wt % maleic anhydride modified polypropylene (BYNEL® 50E571, E. I. du Pont de Nemours and Company). * Means Trademark of The Dow Chemical Company.

Process the adhesive layer using a single screw extruder with a 2.5 inch (6.4 centimeter (cm) diameter screw that has a 24:1 length to diameter (L/D) ratio and the following temperature profile: zone 1-350° Fahrenheit (° F) (177° C.)), zone 1-380° F. (193° C.), zone 3-400° F. (204° C.), and zone 4-420° F. (216° C.).

Prepare the barrier layers using two single screw extruders. One extruder has a 1.25 inch (3.2 cm) diameter screw with a 20:1 L/D ratio and the following temperature profile: zone 1-420° F. (216° C.), zone 2-440° F. (227° C.), zone 3-455° F. (235° C.), and zone 4-455° F. (235° C.). The other extruder has a 2.0 inch (5.1 cm) diameter screw with a 16:1 L/D ratio and the same temperature profile.

Form the MLABF using a 28 inch (71.1 cm) wide film die with a 0.030 inch (0.8 millimeter (mm)) die gap. The die operates at a set temperature of 400° F. (204° C.) in all zones. Cast the film that exits the die onto a water-cooled cast roll operating at a set temperature of 75° F (24° C.). Treat the adhesive side of the MLABF with a corona discharge, and then wind it onto a core at a rate of 47 feet/minute (ft/min) (14.3 meters/min (m/min)).

Subject the MLABF to measurements and physical property testing and summarize the results in Table 1 where "MD" means machine direction, "TD" means transverse direction, "Elong" means elongation, "TS" means tensile stress, "SM" means secant modulus, and "E" means Elmendorf.

TABLE 1

| Property | |
|---|---|
| MD E Tear, g/25 $\mu$m | 234.7 |
| TD E Tear, g/25 $\mu$m | 622 |
| MD TS, psi/MPa | 5302/36.6 |
| TD TS, psi/MPa | 4039/27.8 |
| MD % Elong | 529 |

TABLE 1-continued

| Property | |
|---|---|
| TD % Elong | 575 |
| MD 2% SM, psi/MPa | 28654/197.6 |
| TD 2% SM, psi/MPa | 25716177.3 |
| MD 1% SM, psi/MPa | 33430/230.5 |
| TD 1% SM, psi/MPa | 30262/208.7 |

Ex 2

Replicate Ex 1, but make certain changes to the adhesive layer, apparatus and process conditions, to prepare a 1.85 mil (47 μm) MLABF that constitutes 50 vol % adhesive layer and a 50 vol % barrier layer, both percentages being based on MLABF volume. Vary the adhesive layer composition of Ex 1 by decreasing LLDPE to 34 wt % and increasing EAA copolymer to 60 wt %. Process the barrier layer with two extruders as in Ex 1, but use two 2.0 inch (5.1 cm) diameter, 16:1 L/D ratio screw extruders and reduce the zone 2 temperature to 420° F. (216° C.). Form the MLABF as in Ex 1, but reduce the wind rate to 43 ft/min (13.1 m/min). Summarize the test results in Table 2.

TABLE 2

| Property | |
|---|---|
| MD E Tear, g/25 μm | 151.2 |
| TD E Tear, g/25 μm | 763.2 |
| MD TS, psi/MPa | 5706/39.3 |
| TD TS, psi/MPa | 4106/28.3 |
| MD % Elong | 458 |
| TD % Elong | 553 |
| MD 2% SM, psi/MPa | 38713/266.9 |
| TD 2% SM, psi/MPa | 35213242.8 |
| MD 1% SM, psi/MPa | 44577307.4 |
| TD 1% SM, psi/MPa | 43441299.5 |

Ex 3

Replicate Ex 2, but make certain changes to prepare a 1.67 mil (42 μm) MLABF that constitutes 64 vol % adhesive layer and a 36 vol % barrier layer, both percentages being based on MLABF volume. Use two extruders rather than one to prepare the adhesive layer and one extruder rather than two to prepare the barrier layer. The adhesive layer extruders are a 3.5 inch (8.9 cm) diameter screw with a 24:1 L/D ratio and a 4.5 inch (11.4 cm) diameter screw with a 28:1 L/D ratio. Both extruders use the following temperature profile: zone 1-1750° C., zone 2-180° C., zone 3-210° C., and zone 4-210° C. The barrier layer extruder has a 3.5 inch (8.9 cm) diameter screw with a 28:1 L/D ratio and the following temperature profile: zone 1-210° C., zone 2-230° C., zone 3-220° C., and zone 4-210° C.

Maintain the layer compositions of Ex 2, but continually add edge trim from the film to the second (4.5 inch (11.4 cm) screw) adhesive layer extruder.

Cast the MLABF as in Ex. 1, but use an 82 inch (208 cm) wide film die operating at a set temperature of 205° C. in all zones and a 50° C. cast roll set temperature. Also increase the rate at which the film is wound on a core to 196 ft/min (59.7 m/min). Summarize the test results in Table 3. Table 3 also shows differential scanning calorimetry (DSC) scan peaks.

TABLE 3

| Property | |
|---|---|
| MD E Tear, g/25 μm | 113 |
| TD E Tear, g/25 μm | 569 |
| MD % Elong | 584 |
| TD % Elong | 612 |
| MD TS, psi/MPa | 6109/42.1 |
| TD TS, psi/MPa | 3684/25.4 |
| MD 2% SM, psi/MPa | 50705349.6 |
| TD 2% SM, psi/MPa | 44057303.8 |
| MD 1% SM, psi/MPa | 64536445.0 |
| TD 1% SM, psi/MPa | 55318381.4 |
| DSC 1st scan peaks, ° C. | 96, 124, 163 |

Ex 4

Replicate Ex 2 with changes to prepare a 1.61 mil (41 μm) MLABF that constitutes 65 vol % adhesive layer and a 35 vol % barrier layer, both percentages being based on MLABF volume. Use two 2.0 inch (5.1 cm) extruders to prepare the adhesive layer and one 2.5 inch (6.4 cm) extruder to prepare the barrier layer. The adhesive layer formulations duplicate that of Ex 2 except that the second extruder contains AMPACET® 16180 blue color concentrate in an amount of 2 parts per 100 parts by weight (pph) of the remaining components of the formulation.

The first 2.0 inch extruder has the following temperature profile: zone 1-330° F. (165.60C), zone 2-340° F. (171.1° C.), zone 3-365° F. (185.0° C.) and zone 4-380° F. (193.3° C.). The second 2.0 inch extruder has the following temperature profile: zone 1-340° F. (171.1° C.), zone 2-360° F. (182.2° C.) and zone 3-380° F. (193.30° C.). The 2.5 inch extruder has the following temperature profile: zone 1-400° F. (204.4° C.), zone 2-420° F. (215.6° C.), zone 3-450° F. (232.2° C.) and zone 4-450° F. (232.2° C). Cast the film as in Ex. 2, but reduce the MLABF wind rate to 42 ft/min (12.8 rn/min). Summarize test results in Table 4, which also includes opacity index.

TABLE 4

| Property | |
|---|---|
| Opacity Index | 16.64 |
| MD E Tear, g/25 μm | 239.5 |
| TD E Tear, g/25 μm | 852.3 |
| MD TS, psi/MPa | 4870/33.6 |
| TD TS, psi/MPa | 3720/25.6 |
| MD % Elong | 415 |
| TD % Elong | 519 |
| MD 2% SM, psi/MPa | 28085/193.6 |
| TD 2% SM, psi/MPa | 24768/170.8 |
| MD 1% SM, psi/MPa | 30127/207.7 |
| TD 1% SM, psi/MPa | 28024/193.2 |

Ex 5

Replicate Ex 3 with changes to prepare a 2.44 mil (62 μm) MLABF that constitutes a 69 vol % adhesive layer and a 31 vol % barrier layer. Reduce the temperature for zones 3–5 of the 3.5 inch extruder and zones 3 and 4 of the 4.5 inch extruder to 200° C. and increase the temperature for zones 3 and 4 of the barrier layer extruder respectively to 230° C. and 220° C. Change the MLABF wind speed to 157 ft/min (47.8 m/min). Summarize test results in Table 5.

TABLE 5

| Property | |
|---|---|
| MD E Tear, g/25 μm | 203 |
| TD E Tear, g/25 μm | 310 |
| MD % Elong | 526 |
| TD % Elong | 568 |
| MD TS, psi/MPa | 5656/39.0 |
| TD TS, psi/MPa | 3987/27.5 |
| MD 2% SM, psi/MPa | 40072/276.3 |
| TD 2% SM, psi/MPa | 38790/267.5 |
| MD 1% SM, psi/MPa | 50572/348.7 |
| TD 1% SM, psi/MPa | 47605/328.2 |
| DSC 1st scan peaks, ° C. | 96, 123, 164 |

Ex 6

Replicate Ex 4 with certain changes to prepare a multiple layer adhesive and barrier film with an overall thickness average of 1.94 mil (49 μm) MLABF that constitutes a 78 vol % adhesive layer and a 22 vol % barrier layer. Switch the extruders to use the 2.5 inch extruder as the second adhesive layer extruder and the second 2.0 inch extruder as the barrier layer extruder. Process the color concentrate-containing core layer formulation (63 vol % based on total multiple layer film volume) in the 2.0 inch (5.1 cm) extruder and the color concentrate-free adhesive layer formulation (15 vol % based on total multiple layer film volume) in the 2.5 inch (5.1 cm) extruder. Use the adhesive layer formulations of Ex 4, but change color concentrate and amount to 8 pph of AMPACET® 13805 yellow color concentrate. The first 2.0 inch extruder has the following temperature profile: zone 1-340° F. (171° C.), zone 2-360° F. (182° C.), zone 3-380° F. (193° C.) and zone 4-380° F. (193° C.). The second 2.0 inch extruder has the following temperature profile: zone 1-400° F. (204° C.), zone 2-420° F. (216° C.), zone 3-450° F. (232° C.) and zone 4-450° F. (232° C.). The 2.5 inch extruder has the following temperature profile: zone 1-330° F. (166° C.), zone 2-340° F. (171° C.), zone 3-380° F. (193° C.) and zone 4-380° F. (193° C.). Cast the film as in Ex. 4, but reduce the rate at which the film is wound on a core to 37 ft/min (11.3 m/min).

Summarize the test results in Table 6.

TABLE 6

| Property | |
|---|---|
| Opacity Index | 23.36 |
| MD E Tear, g/25 μm | 261.9 |
| TD E Tear, g/25 μm | 695.4 |
| MD TS, psi/MPa | 5147/35.5 |
| TD TS, psi/MPa | 3865/26.6 |
| MD % Elong | 481 |
| TD % Elong | 565 |
| MD 2% SM, psi/MPa | 31550/217.5 |
| TD 2% SM, psi/MPa | 30349/209.3 |
| MD 1% SM, psi/MPa | 36416/251.1 |
| TD 1% SM, psi/MPa | 37713/260.0 |
| DSC Melting Peaks, ° C. | 97/123/163 |

Ex 7

Replicate Ex 6, but use 6 pph of the blue color concentrate used in Ex 4 rather than 8 pph of the yellow color concentrate of Ex 6, to prepare a 1.96 mil (50 μm) MLABF that constitutes a 73 vol % adhesive layer and a 27 vol % barrier layer. Apportion the adhesive layer formulation such that the 2.0 inch extruder processes 56 vol % and the 2.5 inch extruder processes 17 vol %, both percentages based on total MLABF volume. Reduce the set point temperature for zone 3 of the 2.5 inch extruder to 365° F. (185° C.). Summarize test results in Table 7.

TABLE 7

| Property | |
|---|---|
| Opacity Index | 33.33 |
| MD E Tear, g/25 μm | 251.2 |
| TD E Tear, g/25 μm | 348.3 |
| MD TS, psi/MPa | 5421/37.4 |
| TD TS psi/MPa | 3841/26.5 |
| MD % Elong | 492 |
| TD % Elong | 554 |
| MD 2% SM, psi/MPa | 32212/222.1 |
| TD 2% SM, psi/MPa | 28954/199.6 |
| MD 1% SM, psi/MPa | 38673/266.6 |
| TD 1% SM, psi/MPa | 34719/239.4 |
| DSC Melting Peaks, ° C. | 97/123/163 |

Ex 8

Replicate Ex 6, with certain changes, to prepare 2.82 mil (72 μm) MLABF that constitutes a 27 vol % adhesive layer, a 45 vol % core layer, and a 28 vol % barrier layer. Increase the yellow color concentrate loading to 10.8 pph. Apportion the adhesive layer formulation such that the 2.0 inch extruder processes 45 vol % and the 2.5 inch extruder processes 27 vol %, both percentages based on total MLABF volume. Increase the MLABF wind speed to 40 ft/min (12.2 m/min). Summarize test results in Table 8.

TABLE 8

| Property | |
|---|---|
| Opacity Index | 31.2 |
| MD E Tear, g/25 μm | 262.7 |
| TD E Tear, g/25 μm | 641.6 |
| MD TS, psi/MPa | 4572/31.5 |
| TD TS, psi/MPa | 3397/23.4 |
| MD % Elong | 475 |
| TD % Elong | 533 |
| MD 2% SM, psi/MPa | 27351/188.6 |
| TD 2% SM, psi/MPa | 24585/169.5 |
| MD 1% SM, psi/MPa | 29468/203.2 |
| TD 1% SM, psi/MPa | 26748/184.4 |
| DSC Melting Peaks, ° C. | 97/123/162 |

Ex 9

Replicate Ex 8 with changes to prepare a 2.66 mil (68 μm) MLABF that constitutes a 18 vol % adhesive layer. A 53 vol % core layer, and a 29 vol % barrier layer. The adhesive layer formulation used in the 2.5 inch extruder (18 vol % based on total MLABF volume) contains 97 wt % of the EAA copolymer of Ex. 1 and 3 wt % of the anti-block concentrate of Ex. 1, both percentages based on formulation weight and totaling 100 wt %. The core layer formulation used in the 2.0 inch extruder (53 vol % based on total MLABF volume) varies the ratios used in Ex. 8 such that it contains 35 wt % LLDPE, 55 wt % EAA copolymer and 10 wt % yellow color concentrate, all wt % being based on formulation weight and totaling 100 wt %. Change the 2.5 inch extruder temperature profile to: zone 1-320° F. (160° C.), zone 2-330° F. (166° C.), zone 3-340° F. (171° C.) and zone 4-350° F. (177° C.).

Decrease the MLABF wind speed to 37 ft/min (11.3 m/min). Summarize the test results in Table 9.

TABLE 9

| Property | |
| --- | --- |
| Opacity Index | 33.69 |
| MD E Tear, g/25 μm | 354.0 |
| TD E Tear, g/25 μm | 822.1 |
| MD TS, psi/MPa | 4731/32.6 |
| TD TS, psi/MPa | 3533/24.4 |
| MD % Elong | 477 |
| TD % Elong | 521 |
| MD 2% SM, psi/MPa | 32001/220.6 |
| TD 2% SM, psi/MPa | 30002/206.9 |
| MD 1% SM, psi/MPa | 37711/260.0 |
| TD 1% SM, psi/MPa | 34859/240.3 |
| DSC Melting Peaks, °C. | 97/123/164 |

Ex 10

Replicate Ex 9 using the extruders of Ex 5 and making other changes to prepare a 2.13 mil (54 μm) MLABF that constitutes a 21 vol % adhesive layer, a 44 vol % core layer, and a 35 vol % barrier layer. The adhesive layer formulation used in the first 3.5 inch extruder (21 vol % based on total MLABF volume) is the same as that used in the 2.5 inch extruder of Ex. 9. The core layer formulation used in the 4.5 inch extruder (44 vol % based on total MLABF volume) is the same as that used in the 2.0 inch extruder of Ex. 9 except that it contains green color concentrate (AMPACET® 17106) rather than yellow color concentrate at the same loading. The adhesive layer 3.5 inch extruder temperature profile is zone 1-155° C., zone 2-160° C. and zones 3-5 180° C. Cast the film as in Ex. 5, but increase the MLABF wind speed to 171 ft/min (52.1 mn/mi). Summarize test results in Table 10.

TABLE 10

| Property | |
| --- | --- |
| Opacity Index | 55 |
| MD E Tear, g/25 μm | 173 |
| TD E Tear, g/25 μm | 614 |
| MD % Elong | 453 |
| TD % Elong | 536 |
| MD TS, psi/MPa | 5537/38.2 |
| TD TS, psi/MPa | 4200/29.0 |
| MD 2% SM, psi/MPa | 44119/304.2 |
| TD 2% SM, psi/MPa | 39266/270.7 |
| MD 1% SM, psi/MPa | 54006/372.3 |
| TD 1% SM, psi/MPa | 47655/328.6 |
| DSC 1st scan peaks, Deg C. | 97, 123, 163 |

Ex 11

Replicate Ex 10, with certain changes to prepare a 3.15 mil (80 μm) MLABF that constitutes a 23 vol % adhesive layer, a 45 vol % core layer, and a 32 vol % barrier layer. Vary the ratios used in the 4.5 inch extruder core formulation (45 vol % based on total MLABF volume) such that it contains 34 wt % LLDPE, 54 wt % EAA copolymer and 12 wt % yellow color concentrate (same as Ex 6), all wt % being based on formulation weight and totaling 100 wt %. Change the set point temperatures for Zone 2 of the 4.5 inch extruder to 175° C. and zone 4 of the second 3.5. inch extruder (barrier layer) to 230° C. Decrease the MLABF wind speed to 122 ft/min (37.2 m/min). Summarize test results in Table 11.

TABLE 11

| Property | |
| --- | --- |
| Opacity Index | 33 |
| MD E Tear, g/25 μm | 276 |
| TD E Tear, g/25 μm | 595 |
| MD % Elong | 489 |
| TD % Elong | 575 |
| MD TS, psi/MPa | 4712/32.5 |
| TD TS, psi/MPa | 4080/28.1 |
| MD 2% SM, psi/MPa | 42123/290.4 |
| TD 2% SM, psi/MPa | 41842/288.5 |
| MD 1% SM, psi/MPa | 51339/354.0 |
| TD 1% SM, psi/MPa | 53069/365.9 |
| DSC 1st scan peaks, Deg C. | 97, 124, 163 |

Ex 12

Replicate Ex 11, with changes, to prepare a 3.25 mil (83 μm) MLABF that constitutes a 17 vol % adhesive layer, a 51 vol % core layer, and a 32 vol % barrier layer. Vary the core layer formulation used in the 4.5 inch extruder (51 vol % based on total MLABF volume) from the ratios used in Ex. 10 to eliminate the EAA copolymer resin such that the formulation contains 88 wt % LLDPE and 12 wt % yellow color concentrate, all wt % being based on formulation weight and totaling 100 wt %. Using the temperature zone profiles of Ex. 10 (save for reducing the zone 2 temperature to 175° C. and increasing the zone 4 temperature to 230° C.), cast the film as in Ex. 10, but with the MLABF wind speed of Ex. 11. Summarize test results in Table 12.

TABLE 12

| Property | |
| --- | --- |
| Opacity Index | 36 |
| MD E Tear, g/25 μm | 234 |
| TD E Tear, g/25 μm | 578 |
| MD % Elong | 519 |
| TD % Elong | 576 |
| MD TS, psi/MPa | 4394/30.3 |
| TD TS, psi/MPa | 3879/26.7 |
| MD 2% SM, psi/MPa | 45006/310.3 |
| TD 2% SM, psi/MPa | 41176/283.9 |
| MD 1% SM, psi/MPa | 58325/402.1 |
| TD 1% SM, psi/MPa | 52909/364.8 |
| DSC 1st scan peaks, Deg C. | 97, 124, 164 |

Ex 13

Replicate Ex 12, with changes, to prepare a 1.69 mil (43 μm) MLABF that constitutes a 23 vol % adhesive layer, a 47 vol % core layer, and a 30 vol % barrier layer. Change the core layer formulation processed in the 4.5 inch extruder (47 vol % based on total MLABF volume) to that of Ex. 10. Use the temperature zone profiles of Ex 11 . Increase the MLABF wind speed to 237 ft/min (72.2 m/min). Summarize test results in Table 13.

TABLE 13

| Property | |
| --- | --- |
| Opacity Index | 54 |
| MD E Tear, g/25 μm | 128 |
| TD E Tear, g/25 μm | 676 |
| MD % Elong | 406 |
| TD % Elong | 532 |
| MD TS, psi/MPa | 5363/37.0 |

TABLE 13-continued

| Property | |
|---|---|
| TD TS, psi/MPa | 3816/26.3 |
| MD 2% SM, psi/MPa | 42470/292.8 |
| TD 2% SM, psi/MPa | 38203/263.4 |
| MD 1% SM, psi/MPa | 48016/331.1 |
| TD 1% SM, psi/MPa | 39418/271.8 |
| DSC 1st scan peaks, ° C. | 97, 123, 163 |

It will be apparent to those skilled in the art that various modifications to the preferred embodiment of the invention as described herein can be made without departing from the spirit or scope of the invention as defined by the appended claims.

What is claimed is:

1. A multiple layer adhesive film, consisting of three layers, the layers being a) a core layer having a first side and an opposing second side, b) an adhesive layer bonded to the first side of the core layer, and c) a barrier layer bonded to the second side of the core layer, the barrier layer comprising a polymer blend including a propylene copolymer and an acid anhydride grafted propylene copolymer, the core layer comprising an ethylene/alpha-olefin copolymer, and the adhesive layer comprising an ethylene copolymer that contains polar moieties and an anti-block compound.

2. The film of claim 1, wherein the ethylene/alpha-olefin copolymer in the core layer is linear low density polyethylene.

3. The film of claim 1, wherein the ethylene copolymer having polar moieties is an ethylene/acrylic acid copolymer or a graft-modified ethylene polymer selected from anhydride-modified ethylene polymers and anhydride-modified linear low density polyethylenes.

4. The film of claim 1, wherein the core layer further comprises a color concentrate, the color concentrate comprising an amount of pigment dispersed in a copolymer carrier.

5. The film of claim 4, wherein the copolymer carrier comprises a polymer selected from linear low density polyethylene and low density polyethylene and the amount of pigment ranges from 50 to 70 percent by weight, based on color concentrate weight.

6. The film of claim 1, wherein the acid anhydride grafted propylene copolymer in the polymer blend of the barrier layer is a maleic anhydride grafted propylene copolymer, the grafted copolymer being present in an amount within a range of from 20 to 40 percent by weight, based on polymer blend weight.

7. The film of claim 4, wherein the concentrate is present in an amount within a range of from 10 to 20 percent by weight, based on core layer weight.

8. The film of claim 1, wherein the antiblock concentrate in the adhesive layer comprises silicon dioxide in a low density polyethylene carrier resin, the silicon dioxide being present in an amount within a range of from 15 to 20 percent by weight, based on concentrate weight, the concentrate being present in an amount within a range of from 1 to 10 percent by weight, based on adhesive layer weight.

9. A carpet pad comprising a cushioning foam layer that has at least two spaced-apart and generally parallel major planar surfaces, at least one of said surfaces having adhered thereto the multiple layer adhesive film of any of claims 1–8.

* * * * *